United States Patent
Thapliyal et al.

(10) Patent No.: US 10,896,385 B2
(45) Date of Patent: Jan. 19, 2021

(54) REAL TIME LEARNING OF TEXT CLASSIFICATION MODELS FOR FAST AND EFFICIENT LABELING OF TRAINING DATA AND CUSTOMIZATION

(71) Applicant: GetGo, Inc., Boston, MA (US)

(72) Inventors: Ashish V. Thapliyal, Santa Barbara, CA (US); Alexander John Huitric, Goleta, CA (US); Yogesh Moorjani, Dublin, CA (US)

(73) Assignee: LogMeIn, Inc., Boston, MA (US)

( * ) Notice: Subject to any disclaimer, the term of this patent is extended or adjusted under 35 U.S.C. 154(b) by 776 days.

(21) Appl. No.: 15/661,158

(22) Filed: Jul. 27, 2017

(65) Prior Publication Data

US 2019/0034823 A1 Jan. 31, 2019

(51) Int. Cl.
*G06N 20/00* (2019.01)
*G06F 16/35* (2019.01)

(52) U.S. Cl.
CPC .......... *G06N 20/00* (2019.01); *G06F 16/35* (2019.01)

(58) Field of Classification Search
None
See application file for complete search history.

(56) References Cited

U.S. PATENT DOCUMENTS

| | | | |
|---|---|---|---|
| 7,028,250 B2 | 4/2006 | Ukrainczyk et al. | |
| 7,366,705 B2 | 4/2008 | Zeng et al. | |
| 7,707,129 B2 | 4/2010 | Zhuang et al. | |
| 7,752,159 B2* | 7/2010 | Nelken | G06F 40/205 706/62 |
| 8,229,866 B2 | 7/2012 | Alaniz | |
| 8,478,054 B2 | 7/2013 | Sun | |
| 9,060,062 B1* | 6/2015 | Madahar | G06Q 30/016 |
| 9,069,798 B2 | 6/2015 | Hershey et al. | |
| 9,342,794 B2 | 5/2016 | Mahler et al. | |
| 9,348,901 B2 | 5/2016 | Chattopadhayay et al. | |
| 2002/0127529 A1 | 9/2002 | Cassuto et al. | |
| 2007/0183655 A1* | 8/2007 | Konig | G06K 9/6282 382/159 |
| 2009/0276383 A1* | 11/2009 | Salahshour | G06F 9/542 706/12 |
| 2010/0257117 A1* | 10/2010 | Shvadron | G06F 16/313 705/36 R |

(Continued)

*Primary Examiner* — Alan Chen
(74) *Attorney, Agent, or Firm* — BainwoodHuang

(57) ABSTRACT

Techniques for real-time generation and customization of text classification models. An initial dataset of input text samples are manually assigned labels, and the labeled input text samples are tokenized and provided as training data to train machine learning classifiers for various classes or categories of the input text samples. As the machine learning classifiers train with the training data, feedback in the form of suggestions (or predictions) are provided in real time by the text classification models regarding which label(s) to assign to any input text sample(s) currently in the training data or any new input text sample(s) further provided as training data for the respective machine learning classifiers. The suggested (or predicted) label(s) can be manually assigned to the input text sample(s), if deemed appropriate, and the newly labeled input text sample(s) can be provided to supplement the existing training data for the respective machine learning classifiers.

20 Claims, 4 Drawing Sheets

(56) References Cited

U.S. PATENT DOCUMENTS

| | | | |
|---|---|---|---|
| 2012/0245925 A1* | 9/2012 | Guha | G06F 40/20 |
| | | | 704/9 |
| 2013/0138735 A1* | 5/2013 | Kanter | G06Q 10/101 |
| | | | 709/204 |
| 2015/0088897 A1* | 3/2015 | Sherman | G06Q 10/00 |
| | | | 707/740 |

* cited by examiner

REAL TIME LEARNING OF TEXT CLASSIFICATION MODELS FOR FAST AND EFFICIENT LABELING OF TRAINING DATA AND CUSTOMIZATION

BACKGROUND

Automated text classification techniques involve tasks of automatically classifying or categorizing input text samples into a plurality of defined classes or categories. Such automated text classification techniques generally employ machine learning classifiers, which typically train on large corpuses of training data to generate text classification models for use in classifying or categorizing the input text samples. The training data typically contains representative positive examples of input text samples that belong in particular classes or categories, as well as negative examples of input text samples that are explicitly not in the particular classes or categories. As the size of a corpus of training data for a class or category increases, the accuracy of a text classification model for the class or category tends to be enhanced. As the size of the corpus of training data for the class or category decreases, the accuracy of the text classification model for the class or category is generally degraded.

SUMMARY

Techniques are disclosed herein for real-time generation and customization of text classification models that allow for faster and more efficient classifying or categorizing of input text samples, using reduced amounts of training data. A plurality of descriptive words or phrases (also referred to herein as "labels") corresponding to various classes or categories of the input text samples can be manually assigned to an initial dataset of input text samples. The labeled dataset of input text samples can be tokenized and provided as training data to train machine learning classifiers for generating the respective text classification models corresponding to the various classes or categories. As the machine learning classifiers train with the training data, suggestions (or predictions) can be provided in real-time by the text classification models regarding what label(s) to assign to any input text sample(s) currently in the training data or any new input text sample(s) further provided as training data for the machine learning classifiers. The suggested (or predicted) label(s) can be manually assigned to the input text sample(s), in accordance with the suggestions (or predictions) provided by the text classification models, and the newly labeled input text sample(s) can be used to supplement the existing training data for the machine learning classifiers. In this way, the text classification models for classifying or categorizing input text samples can be generated and customized faster and more efficiently in real-time and with increased accuracy and precision. Once it has been determined that the machine learning classifiers have been sufficiently trained, based at least on model statistics, the text classification models can be used to automatically generate label suggestions (or predictions) for subsequent input text samples provided to the respective text classification models for the various classes or categories of the input text samples.

In certain embodiments, a computer-implemented method of training a plurality of text classification models includes predefining multiple labels corresponding to various classes of input samples for an initial dataset of the input text samples, and manually assigning the predefined labels to selected ones of the initial dataset of the input text samples to indicate that the input text samples belong in particular ones of the various classes. Once a predefined label has been manually assigned to each of the initial dataset of the input text samples, the initial dataset of the input text samples is provided as training data to train a plurality of machine learning classifiers for generating the plurality of text classification models, respectively. The plurality of text classification models correspond to the various classes, respectively. While the plurality of machine learning classifiers trains with the training data, label suggestions are provided in real-time by the plurality of text classification models regarding what predefined labels to assign to any of the input text samples in the training data. The predefined labels are manually assigned to at least some of the input text samples in accordance with the label suggestions from the plurality of text classification models, and at least some of the input text samples are provided as supplements to the training data for the plurality of machine learning classifiers.

In such certain embodiments, once a predefined label has been manually assigned to each of the initial dataset of the input text samples, the initial dataset of the input text samples is tokenized, and the tokenized initial dataset of the input text samples is provided as training data to train the plurality of machine learning classifiers. Further, a determination is made as to whether the plurality of machine learning classifiers has been sufficiently trained based at least on statistics pertaining to the respective text classification models. Once it has been determined that the plurality of machine learning classifiers has been sufficiently trained, further label suggestions are provided in real-time by the plurality of text classification models for subsequent input text samples for the various classes of the input text samples.

In certain embodiments, a system for training a plurality of text classification models includes a server having at least one processor operative to execute at least one program out of at least one memory to receive an initial dataset of input text samples with predefined labels manually assigned thereto to indicate that the input text samples belong in particular ones of various classes, and to provide the initial dataset of the input text samples as training data to train a plurality of machine learning classifiers for generating the plurality of text classification models, respectively. The plurality of text classification models correspond to the various classes, respectively. While the plurality of machine learning classifiers train with the training data, the processor is further operative to execute the program out of the memory to provide, through the plurality of text classification models, label suggestions in real-time regarding what predefined labels to assign to any of the input text samples in the training data, to receive at least some of the input text samples with the predefined labels manually assigned thereto in accordance with the label suggestions, and to provide at least some of the input text samples as supplements to the training data for the plurality of machine learning classifiers.

In certain embodiments, a computer program product is provided having non-transitory computer readable media that stores at least one set of instructions to implement a method of training a plurality of text classification models. The set of instructions, when carried out by computerized circuitry, cause the computerized circuitry to perform the method including receiving an initial dataset of input text samples with predefined labels manually assigned thereto to indicate that the input text samples belong in particular ones of various classes, and providing the initial dataset of the input text samples as training data to train a plurality of machine learning classifiers for generating the plurality of text classification models, respectively. The plurality of text classification models correspond to the various classes, respectively. While the plurality of machine learning classifiers train with the training data, label suggestions are provided in real-time, through the plurality of text classification models, regarding what predefined labels to assign to any of the input text samples in the training data. At least some of the input text samples are received with the predefined labels manually assigned thereto in accordance with the label suggestions, and at least some of the input text samples are provided as supplements to the training data for the plurality of machine learning classifiers.

Other features, functions, and aspects of the present application will be evident from the Detailed Description that follows.

BRIEF DESCRIPTION OF THE DRAWINGS

The foregoing and other objects, features and advantages will be apparent from the following description of particular embodiments of the present application, as illustrated in the accompanying drawings in which like reference characters refer to the same parts throughout the different views.

FIG. 2 is an illustration of an exemplary graphical user interface (GUI) of the server of FIG. 1b, which can be employed to perform real-time generation and customization of text classification models within the system of FIG. 1a; and FIG. 3 is a flow diagram of an exemplary method of performing real-time generation and customization of text classification models within the system of FIG. 1a.

DETAILED DESCRIPTION

Techniques are disclosed herein for real-time generation and customization of text classification models that allow for faster and more efficient classifying or categorizing of input text samples, using reduced amounts of training data. A plurality of descriptive words or phrases (also referred to herein as "labels") corresponding to various classes or categories of input text samples can be predefined and manually assigned to an initial dataset of input text samples to indicate that the input text samples belong in particular ones of the various classes or categories. If a remaining amount of the initial dataset of input text samples does not appear to belong in any of the various classes or categories, then an additional predefined label (e.g., "IGNORE") can be manually assigned to each such input text sample. Once a label (e.g., a descriptive word/phrase or "IGNORE") has been manually assigned to each of the initial dataset of input text samples, the labeled dataset of input text samples can be tokenized and provided as training data to train machine learning classifiers for generating the respective text classification models corresponding to the various classes or categories. As the machine learning classifiers train with the training data, suggestions (or predictions) can be provided in real-time by the text classification models regarding what predefined label(s) to assign to any input text sample(s) currently in the training data or any new input text sample(s) further provided as training data for the machine learning classifiers. The suggested (or predicted) label(s) can be manually assigned to the input text sample(s), in accordance with the suggestions (or predictions) provided by the text classification models, and the newly labeled input text sample(s) can be used to supplement the existing training data for the machine learning classifiers. In this way, the text classification models for classifying or categorizing input text samples can be generated and customized faster and more efficiently in real-time and with increased accuracy and precision. Once it has been determined that the machine learning classifiers have been sufficiently trained, based at least on model statistics, the text classification models can be used to automatically generate label suggestions (or predictions) for subsequent input text samples provided to the text classification models for the various classes or categories of the input text samples.

Figure 1A:
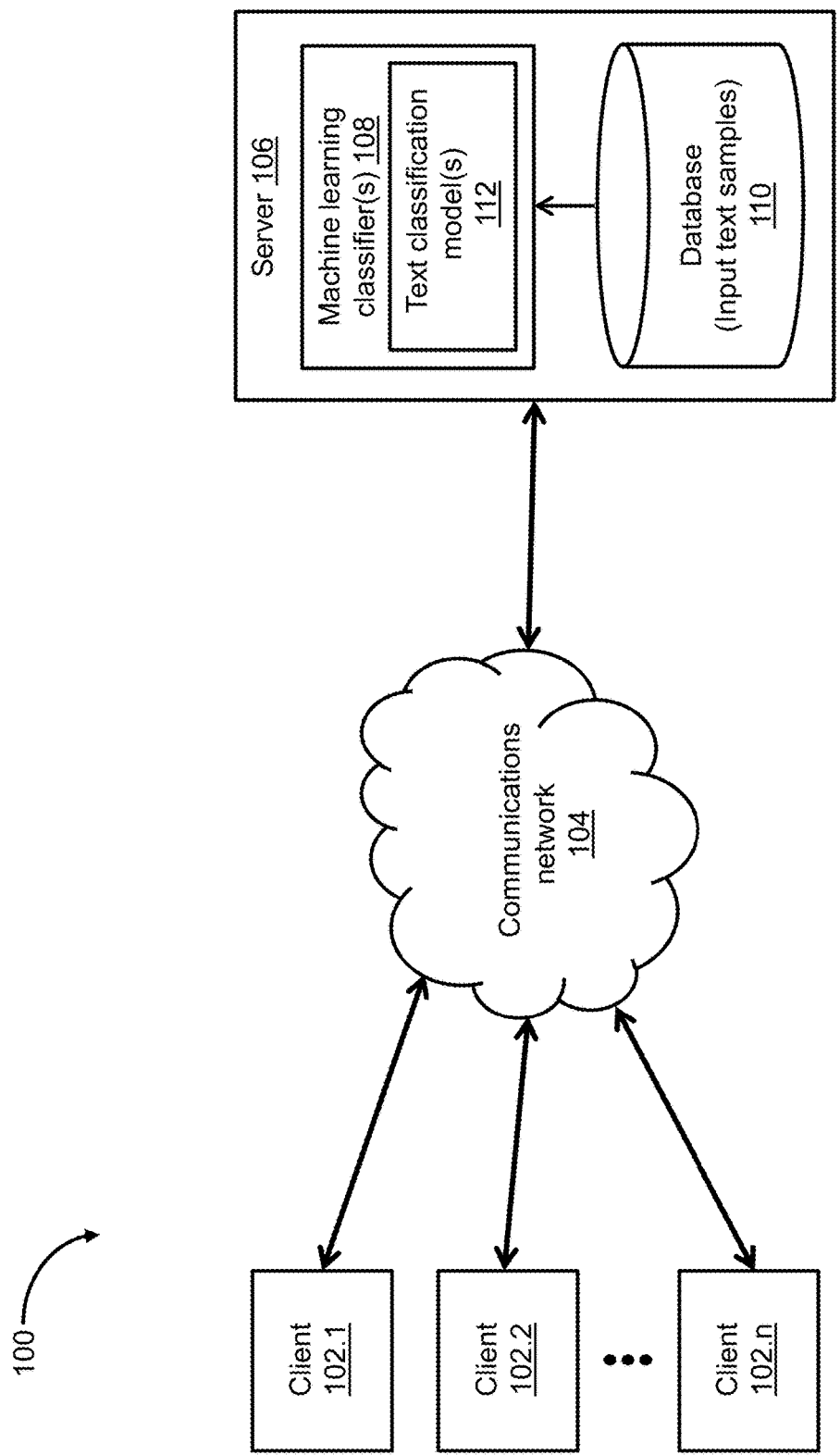
FIG. 1a is a block diagram of an exemplary system that performs real-time generation and customization of text classification models for classifying or categorizing input text samples, using reduced amounts of training data.

FIG. 1a depicts an illustrative embodiment of an exemplary system 100 for real-time generation and customization of text classification models for classifying or categorizing input text samples. As shown in FIG. 1a, the system 100 can include one or more client computers (also referred to herein as the "client(s)") 102.1, 102.2, . . . , 102.n, and a server computer (also referred to herein as the "server") 106 communicably coupled to the clients 102.1, 102.2, . . . , 102.n by at least one communications network 104 (also referred to herein as the "network"). For example, the system 100 can be an online meeting system, a desktop sharing system, a video conferencing system, and/or any other suitable communications system. The server 106 can include one or more processors operative to execute at least one computer program out of at least one memory to train one or more machine learning classifiers 108 for generating one or more text classification models 112, as well as a database 110 for storing input text samples, which can be derived from voice, non-voice (e.g., text), and/or any other suitable communications with users of one or more of the clients 102.1, 102.2, . . . , 102.n. Each of the machine learning classifiers 108 can train on at least an initial dataset of input text samples to generate and customize the text classification models 112, which can be used to automatically classify or categorize subsequent input text samples derived from communications with the users of the respective clients 102.1, 102.2, . . . , 102.n.

Figure 1B:
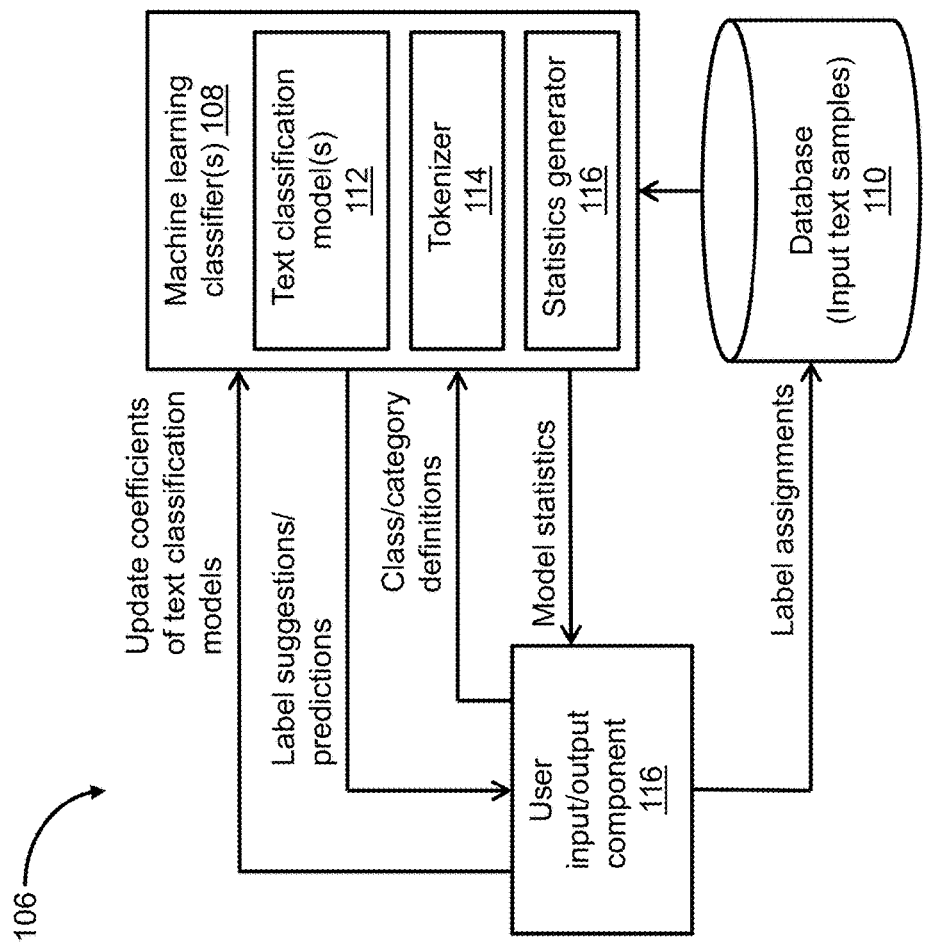
FIG. 1b is a block diagram of an exemplary server that includes functional/logical components operative to train machine learning classifiers for generating the text classification models of FIG. 1a, as well as a database for storing the input text samples.

FIG. 1b depicts a detailed view of functional/logical components of the server 106 included in the system 100 of FIG. 1a. As shown in FIG. 1b, the server 106 can further include a user input/output (I/O) component 116, which can include one or more user input devices and/or one or more user output devices configured to allow a human to interact with the server 106. For example, the user I/O component 116 can include a display, a touchscreen, a touchpad, a keypad, a keyboard, at least one button, at least one dial, and/or any other suitable user I/O device(s) or combination thereof. As further shown in FIG. 1b, the server 106 includes the machine learning classifiers 108 for use in generating and customizing the text classification models 112, a tokenizer 114 for tokenizing the input text samples, as well as a statistics generator 116 for generating model statistics (e.g., correlation, +precision, −precision, recall, F1) pertaining to the text classification models 112.

The system 100 for real-time generation and customization of text classification models for classifying or categorizing input text samples will be further understood with reference to the following illustrative example. In this example, the system 100 of FIG. 1a is configured as an online meeting system, a desktop sharing system, and/or a video conferencing system, which can be implemented using GoToMeeting® software marketed by LogMeIn®, Inc., Boston, Mass., USA, or any other suitable software. Further, the input text samples derived from communications between users of the clients 102.1, 102.2, ..., 102.n and a user of the server 106 over the network 104 correspond to comment posts (also referred to herein as user "feedback") from at least some of the users of the clients 102.1, 102.2, ..., 102.n after having engaged in an online meeting or video conference within the system 100.

Figure 2:
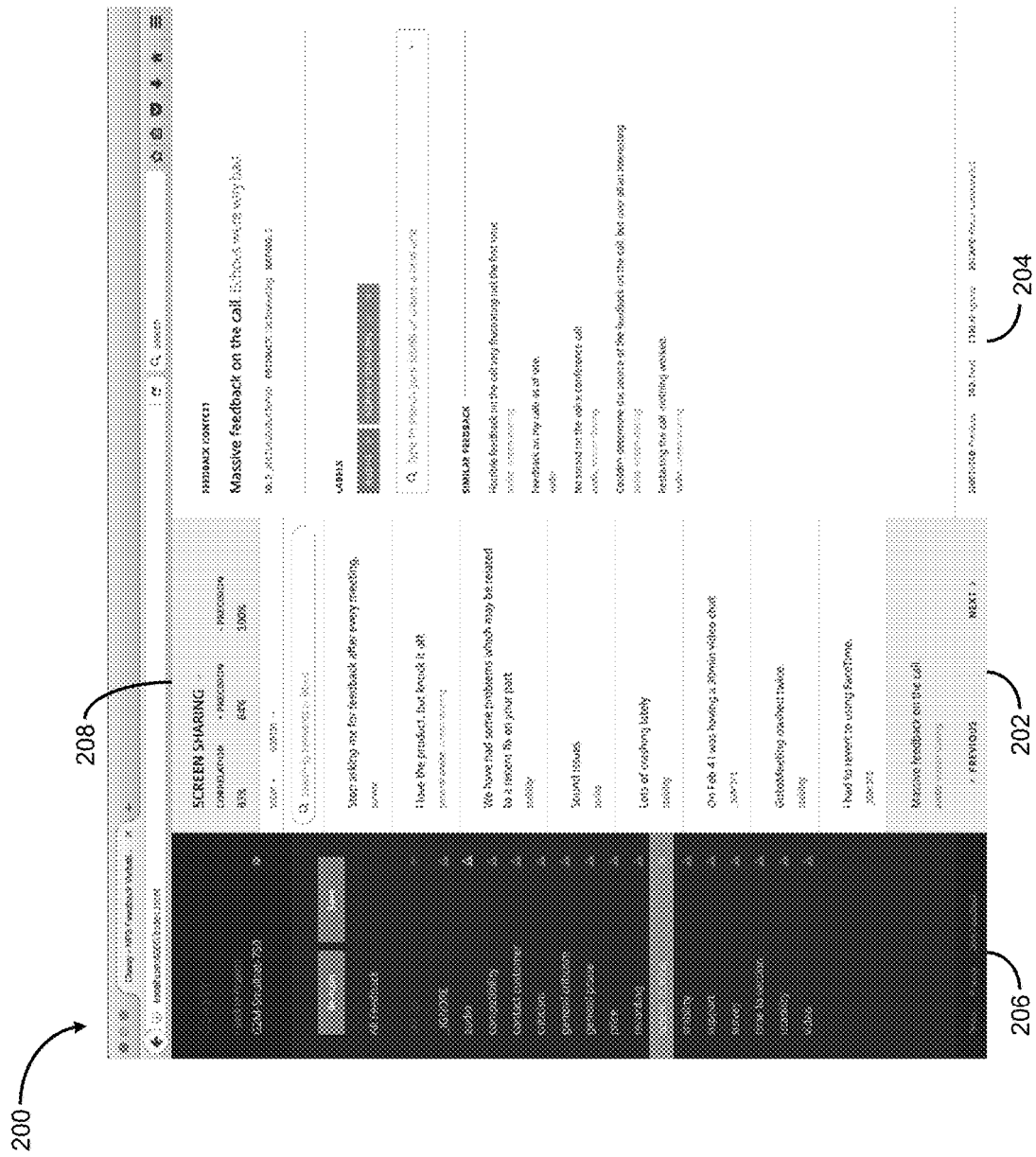

FIG. 2 depicts a graphical user interface (GUI) 200 of the server 106 of FIGS. 1a and 1b, which can be used to perform real-time generation and customization of the text classification models 112. For example, the GUI 200 can be implemented on a display associated with the user I/O component 116 of the server 106. In this example, the user of the server 106 (e.g., a customer care representative) receives comment posts (user feedback) from the users of the clients 102.1, 102.2, ..., 102.n in the form of input text samples. As shown in FIG. 2, a first panel 202 of the GUI 200 displays a number of exemplary input text samples, such as "Stop asking me for feedback after every meeting," "I love the product, but knock it off," "We have had some problems which may be related to a recent fix on your part," "Sound issues," "Lots of crashing lately," "On Feb. 4 I was having a 30 min video chat," "Meeting crashed twice," "I had to revert to using another system," "Massive feedback on the call," and/or any other suitable input text sample(s). As further shown in FIG. 2, a second panel 204 of the GUI 200 displays additional exemplary input text samples similar to those displayed in the first panel 202, such as "Horrible feedback on the call. Very frustrating. Not the first time," "Feedback on my calls as of late," "No sound on the voice conference call," "Couldn't determine the source of the feedback on the call, but overall an interesting caller session," "Restarting the call—nothing worked," and/or any other suitable input text sample(s). It is noted that the term "feedback" used in several of the exemplary input text samples displayed in the first and second panels 202, 204 of the GUI 200 can refer to undesirable sounds (e.g., rumbling, whining, whistling) that may result from amplified signals (e.g., speech) inadvertently being returned as input signals and subsequently being retransmitted to the users through the clients 102.1, 102.2, ..., 102.n. Based at least on an initial dataset of input text samples from the users of the clients 102.1, 102.2, ..., 102.n, the customer care representative defines, through the GUI 200, a plurality of descriptive words and/or phrases (also referred to herein as "labels") that correspond to various classes or categories of the input text samples. As shown in FIG. 2, the GUI 200 includes a third panel 206 that displays an exemplary list of predefined labels for the input text samples, such as "audio," "compatibility," "contact customer," "criticism," "general criticism," "general praise," "price," "recording," "screen sharing," "stability," "support," "survey," "time to session," "usability," "video," and/or any other suitable label(s). As further shown in FIG. 2, the third panel 206 displays an additional label, such as "IGNORE" or any other suitable label, which can be predefined through the GUI 200 for any input text sample(s) that do not appear to belong in any of the various classes or categories. As shown in FIG. 1b, the class/category definitions corresponding to the predefined labels can be provided through the user I/O component 116 to the machine learning classifiers 108.

In this example, the customer care representative manually assigns the predefined labels to selected ones of the initial dataset of input text samples to indicate that the selected input text samples belong in particular classes or categories. As shown in FIG. 2, the first panel 202 of the GUI 200 displays several predefined labels manually assigned to selected input text samples, such as the label "survey" manually assigned to "Stop asking me for feedback after every meeting," the label "general praise" manually assigned to "I love the product, but knock it off," the label "stability" manually assigned to each of "We have had some problems which may be related to a recent fix on your part," "Lots of crashing lately," and "Meeting crashed twice," and the label "audio" manually assigned to both "Sound issues" and "Massive feedback on the call." The first panel 202 further displays the additional label "IGNORE" manually assigned to both "On Feb. 4 I was having a 30 min video chat" and "I had to revert to using another system." As further shown in FIG. 2, the second panel 204 of the GUI 200 also displays the label "audio" manually assigned to each of "Feedback on my calls as of late," "No sound on the voice conference call," and "Restarting the call—nothing worked."

Once the initial dataset of input text samples from the users of the clients 102.1, 102.2, ..., 102.n, have been manually assigned labels (e.g., a descriptive word/phrase or "IGNORE") through the GUI 200, the input text samples with their label assignments are provided through the user I/O component 116 for storage in the database 110 (see FIG. 1b). The labeled input text samples are tokenized by the tokenizer 114, which tokenizes each word included in the input text samples into a root form that is common to substantially all uses of the word. For example, the word "asking" can be tokenized into its root form "ask," the word "problems" can be tokenized into its root form "problem," the words "crashing" and "crashed" can each be tokenized into their common root form "crash," and the word "restarting" can be tokenized into its root form "start."

Having tokenized the words of the labeled input text samples into their root forms, the tokenized input text samples are provided as training data to the machine learning classifiers 108 for determining coefficients of the respective text classification models 112 for the various classes or categories of the input text samples. The training data provided to the machine learning classifiers 108 contain positive examples of input text samples with characteristics indicating that the input text samples belong in particular ones of the classes or categories, as well as negative examples of the input text samples that do not have such characteristics. While training on the training data, the machine learning classifiers 108 commence determination of the coefficients of the text classification models 112 such that they infer features of the positive examples of input text samples that are relevant to the characteristics necessary to distinguish the positive examples from the negative examples of the input text samples.

In this example, the machine learning classifiers 108 can be configured to generate what is referred to herein as a "Keyword Pairs" family of text classification models, which take into account individual tokenized keywords and/or pairs of tokenized keywords that occur in a predetermined threshold number of positive examples of input text samples for a particular class or category, but do not occur in more than a specified number of negative examples of input text samples for the particular class or category. In the Keyword Pairs family of text classification models, each keyword (or pair of keywords) is indicative of a particular class or category of the input text samples. For example, the tokenized keyword "ask" may be indicative of the class or category "survey," the tokenized keyword "love" may be indicative of the class or category "general praise," and the pair of tokenized keywords "problem" and "crash" may be indicative of the class or category "stability." Such tokenized keywords (or pairs of tokenized keywords) can correspond to the features inferred from the positive examples of input text samples for a particular class or category that are relevant to the characteristics necessary to distinguish the positive examples from the negative examples of input text samples for the particular class or category. It is noted that words such as "the," "a," "an," "for," "after," "but," "some," "be," and the like are not generally regarded as keywords (or pairs of keywords) because they are not indicative of a particular class or category of input text samples.

In certain embodiments, each tokenized keyword in the Keyword Pairs family of text classification models can be weighted by a weighting parameter, |N/W|, in which "N" corresponds to the number of occurrences of the tokenized keyword in an input text sample, and "W" corresponds to the total number of words in the input text sample. It is noted that the weighting parameter, N/W, for a positive example of an input text sample can have a positive value (+), while the weighting parameter, N/W, for a negative example of the input text sample can have a negative value (−). For example, in a positive example of an input text sample for the class or category "stability," such as "Lots of crashing problems, the meeting crashed twice," the tokenized keyword "crash" occurs twice (i.e., N=2), and the total number of words in the input text sample is eight (i.e., W=8). The weighting parameter for the tokenized keyword "crash" in this positive example for the class or category "stability" can therefore be expressed, as follows:

$$+N/W=+2/8=+1/4. \quad (1)$$

Further, in this positive example for the class or category "stability," the tokenized keyword "problem" occurs once (i.e., N=1). The weighting parameter for the tokenized keyword "problem" in this positive example can therefore be expressed, as follows:

$$+N/W=+1/8. \quad (2)$$

Moreover, in a negative example of an input text sample for the class or category "stability," such as "Sound issues," each of the tokenized keywords "sound" and "issue" occur once (i.e., N=1), and the total number of words in the input text sample is two (i.e., W=2). The weighting parameter for each of the tokenized keywords "sound" and "issue" in this negative example for the class or category "stability" can therefore be expressed, as follows:

$$-N/W=-1/2. \quad (3)$$

By taking into account such weighting parameters for tokenized keywords in positive examples of input text samples for a particular class or category, as well as negative examples of input text samples for the particular class or category, a text classification model in the Keyword Pairs family of text classification models can use the weighting parameters to better infer features of the positive examples of input text samples that are relevant to the characteristics necessary to distinguish the positive examples from the negative examples of input text samples.

In certain further embodiments, the Keyword Pairs family of text classification models can also take into account certain tokenized keywords (or pairs of tokenized keywords) that occur in purportedly positive examples of input text samples for a particular class or category, but indicate that such purportedly positive examples may more appropriately be regarded as negative examples of input text samples for the particular class or category. For example, in a purportedly positive example of an input text sample for the class or category "audio," such as "Lots of crashing problems resulting in no sound," the tokenized keyword "crash" may indicate that this purportedly positive example for the class or category "audio" may more appropriately be regarded as a negative example for the class or category "audio." It is noted that such an input text sample (i.e., "Lots of crashing problems resulting in no sound") may more appropriately be regarded as a positive example of an input text sample for the class or category "stability."

In addition, the Keyword Pairs family of text classification models can take into account the order of tokenized keyword pairs in input text samples while making determinations as to whether the input text samples are positive examples or negative examples for particular classes or categories of the input text samples. For example, in a positive example of an input text sample for the class or category "audio," such as "No sound," the order of the tokenized keyword pair (i.e., "no," "sound") is "no" followed by "sound." However, in a purportedly positive example of an input text sample for the class or category "audio," such as "Sounds great, no problems," the order of the tokenized keyword pair (i.e., "no," "sound") is "sound" followed by "no," indicating that this purportedly positive example for the class or category "audio" may more appropriately be regarded as a negative example for the class or category "audio." It is noted that such an input text sample (i.e., "Sounds great, no problems") may more appropriately be viewed as a positive example of an input text sample for the class or category "general praise."

In this example, as the machine learning classifiers 108 for the various classes or categories of input text samples train with the training data, the text classification models 112 provide label suggestions (or predictions) in real-time through the user I/O component 116 (see FIG. 1b) regarding what predefined label(s) to assign to any input text sample(s) currently in the training data or any new input text sample(s) further provided as training data for the machine learning classifiers 108. As shown in FIG. 2, the first panel 202 of the GUI 200 displays several suggestions (or predictions) for manually assigning labels to certain input text samples, such as the label suggestion/prediction "screen sharing" for both "I love the product, but knock it off" and "Massive feedback on the call." As further shown in FIG. 2, the second panel 204 of the GUI 200 displays several additional suggestions (or predictions) for manually assigning labels to certain input text samples, such as the label suggestion/prediction "screen sharing" for each of "Horrible feedback on the call. Very frustrating. Not the first time," "No sound on the voice conference call," "Couldn't determine the source of the feedback on the call, but overall an interesting caller session," and "Restarting the call—nothing worked," as well as the label suggestion/prediction "audio" for both "Horrible feedback on the call. Very frustrating. Not the first time" and "Couldn't determine the source of the feedback on the call, but overall an interesting caller session." The customer care representative can manually assign the suggested (or predicted) labels to the respective input text samples, in accordance with the suggestions (or predictions) provided by the text classification models 112 (and if deemed appropriate), and the newly labeled input text samples can be provided to supplement the existing training data for the machine learning classifiers 108. In this way, the text classification models 112 can be generated by the machine learning classifiers 108 and customized by the customer care representative faster and more efficiently in real-time with increased accuracy and precision, ultimately using reduced amounts of training data.

Having received the label suggestions (or predictions) from the text classification models 112 and manually assigned at least some of the suggested (or predicted) labels to the respective input text samples in accordance with the suggestions (or predictions), the customer care representative can make a request to the machine learning classifiers 108 through the user I/O component 116 to update the coefficients of the respective text classification models 112 (see FIG. 1b). Once the coefficients of the text classification models 112 have been updated by the machine learning classifiers 108, the statistics generator 116 can generate model statistics for the respective text classification models 112. As shown in FIG. 2, such model statistics (e.g., CORRELATION, +PRECISION, −PRECISION) can be displayed in a region 208 of the GUI 200. Such model statistics can be used by the customer care representative to make judgments as to whether or not the machine learning classifiers 108 have been sufficiently trained for generating the respective text classification models 112.

In certain embodiments, the statistics generator 116 can generate such model statistics for each respective text classification model by making a copy of the text classification model, and training a machine learning classifier for the copy of the text classification model using a selected portion of existing training data for the machine learning classifier. Having trained the machine learning classifier on the selected portion of the existing training data, a remaining portion of the existing training data can be applied to the copy of the text classification model, allowing the text classification model to provide suggestions (or predictions) in real-time regarding what predefined label(s) to assign to any input text sample(s) in the remaining portion of the existing training data. The label suggestions (or predictions) provided by the text classification model can then be compared against prior corresponding label assignments manually performed by the customer care representative, and the model statistics can be calculated, computed, determined, or otherwise obtained based at least in part on the comparison results.

For example, the statistics generator 116 can determine the model statistic "+PRECISION," as follows:

$$+\text{PRECISION} = \frac{\#\_of\_matching\_positive\_examples}{\#\_of\_suggested\_positive\_examples}, \quad (4)$$

in which "#_of_matching_positive_examples" corresponds to the number of label suggestions (or predictions) provided by the text classification model for positive examples of a class or category of the input text samples that match the prior corresponding label assignments manually performed by the customer care representative, and "#_of_suggested_positive_examples" corresponds to the total number of label suggestions (or predictions) provided by the text classification model for the positive examples of the class or category of the input text samples.

Likewise, the statistics generator 116 can determine the model statistic "−PRECISION," as follows:

$$-\text{PRECISION} = \frac{\#\_of\_matching\_negative\_examples}{\#\_of\_suggested\_negative\_examples}, \quad (5)$$

in which "#_of_matching_negative_examples" corresponds to the number of label suggestions (or predictions) provided by the text classification model for negative examples of a class or category of the input text samples that match the prior corresponding label assignments manually performed by the customer care representative, and "#_of_suggested_negative_examples" corresponds to the total number of label suggestions (or predictions) provided by the text classification model for the negative examples of the class or category of the input text samples.

In certain further embodiments, the statistics generator 116 can determine the model statistic "RECALL," as follows:

$$\text{RECALL} = \frac{\#\_of\_matching\_positive\_examples}{\#\_of\_assigned\_positive\_examples}, \quad (6)$$

in which "#_of_matching_positive_examples" corresponds to the number of label suggestions (or predictions) provided by the text classification model for positive examples of a class or category of the input text samples that match the prior corresponding label assignments manually performed by the customer care representative, and "#_of_assigned_positive_examples" corresponds to the total number of label assignments manually performed by the customer care representative for the positive examples of the class or category of the input text samples.

In such certain further embodiments, having determined the model statistic "+PRECISION" (see equation (4)) and the model statistic "RECALL" (see equation (6)), the statistics generator 116 can determine the model statistic "F1," as follows:

$$F1 = \frac{2*(+\text{PRECISION})*\text{RECALL}}{(+\text{PRECISION})+\text{RECALL}}. \quad (7)$$

It is noted that the statistics generator 116 can repeat the determination of model statistics, such as +PRECISION, −PRECISION, RECALL, F1, etc., for each of the text classification models 112 multiple times during the generation of the text classification models 112, obtain an average of each model statistic, and display averages of the model statistics in the region 208 of the GUI 200, allowing the customer care representative to make judgments as to whether or not the machine learning classifiers 108 have been sufficiently trained for generating the respective text classification models 112, As shown in FIG. 2, the region 208 of the GUI 200 displays exemplary averages of model statistics, such as 83%, 84%, and 100% for CORRELATION, +PRECISION, and −PRECISION, respectively, for the text classification model corresponding to the label "SCREEN SHARING." Based on the model statistics displayed in region 208 of the GUI 200, the customer care representative may decide that the machine learning classifier for the text classification model corresponding to the label "SCREEN SHARING" has not yet been sufficiently trained and requires some additional training. Once it has been determined that the machine learning classifiers 112 have been sufficiently trained for generating the text classification models 112, based at least on the model statistics generated by the statistics generator 116, the text classification models 112 can be used to automatically generate label suggestions (or predictions) for subsequent input text samples provided to the respective text classification models 112 for the various classes or categories of the input text samples.

Figure 3:
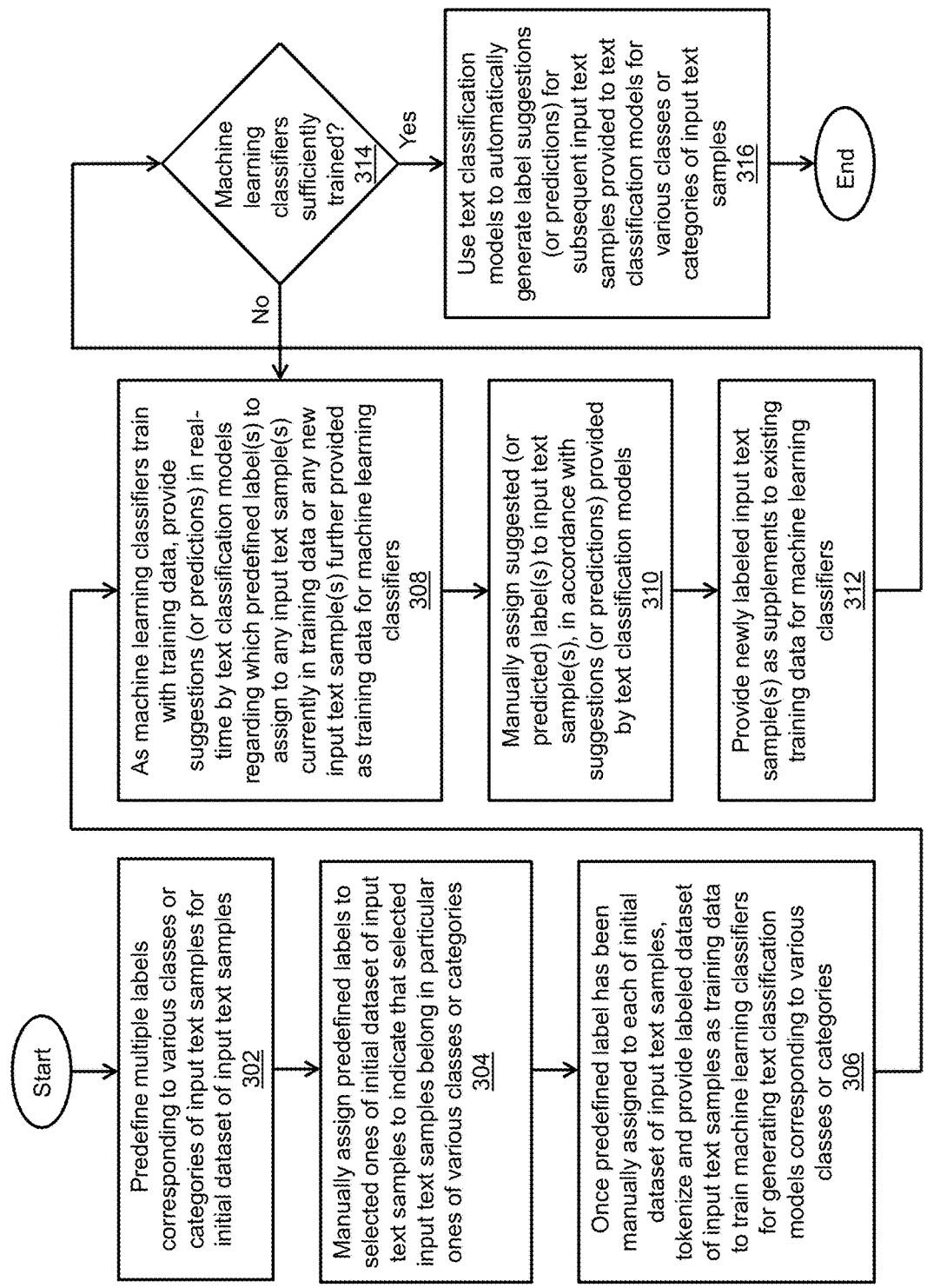

A method of performing real-time generation and customization of text classification models within the system of FIG. 1*a* is described below with reference to FIG. 3. As depicted in block 302, multiple labels corresponding to various classes or categories of input text samples are predefined for an initial dataset of input text samples. As depicted in block 304, the predefined labels are manually assigned to selected ones of the initial dataset of input text samples to indicate that the selected input text samples belong in particular ones of the various classes or categories. As depicted in block 306, once a predefined label has been manually assigned to each of the initial dataset of input text samples, the labeled dataset of input text samples are tokenized and provided as training data to train the machine learning classifiers 108 for generating the text classification models 112 corresponding to the various classes or categories. As depicted in block 308, as the machine learning classifiers 108 train with the training data, suggestions (or predictions) are provided in real-time by the text classification models 112 regarding what predefined label(s) to assign to any input text sample(s) currently in the training data or any new input text sample(s) further provided as training data for the machine learning classifiers 108. As depicted in block 310, the suggested (or predicted) label(s) are manually assigned to the input text sample(s), in accordance with the suggestions (or predictions) provided by the text classification models 112. As depicted in block 312, the newly labeled input text sample(s) are provided as supplements to the existing training data for the machine learning classifiers 108. As depicted in block 314, a determination is made as to whether the machine learning classifiers 108 have been sufficiently trained based at least on model statistics. As depicted in block 316, once it has been determined that the machine learning classifiers 108 have been sufficiently trained, the text classification models 112 are used to automatically generate label suggestions (or predictions) for subsequent input text samples provided to the text classification models 112 for the various classes or categories of the input text samples. Otherwise, the method loops back from block 314 to block 308 to provide further training for the machine learning classifiers 108.

Having described the above illustrative embodiments of systems and methods of real-time generation and customization of text classification models, other alternative embodiments and/or variations can be made and/or practiced. For example, it was described herein that, once a label (e.g., a descriptive word/phrase or "IGNORE") has been manually assigned to each of an initial dataset of input text samples, the labeled dataset of input text samples can be tokenized and provided as training data to train the machine learning classifiers 108 for generating the text classification models 112 corresponding to various classes or categories of input text samples. In certain alternative embodiments, a labeled dataset of input text samples can be vectorized and provided as training data to train the machine learning classifiers 108. Such vectorization of input text samples can include converting tokenized words or whole words from each input text sample into corresponding vector representations, each of which can be expressed as a vector (e.g., a Word2Vec vector, a TF/IDF vector) of numerical values representing mapping points in a meaning space or other body of information where a particular word lies. For example, words having similar meanings may be mapped to nearby points in the meaning space, while words having different meanings may be mapped to points in the meaning space that are not nearby. Having vectorized the tokenized or whole words of the input text samples, the vectorized input text samples can be provided as training data to the machine learning classifiers 108 for determining the coefficients of the respective text classification models 112 for the various classes or categories of the input text samples.

It was further described herein that the machine learning classifiers 108 can be configured to generate the "Keyword Pairs" family of text classification models, which take into account individual tokenized keywords and/or pairs of tokenized keywords that occur in a predetermined threshold number of positive examples of input text samples for a particular class or category, but do not occur in more than a specified number of negative examples of input text samples for the particular class or category. In certain alternative embodiments, the machine learning classifiers can be configured to generate what is referred to herein as a "Covariance" family of text classification models, which take into account a covariance of attributes (such as individual tokenized keywords, weighted tokenized keywords, dimensions of a vector such as a Word2Vec or TF/IDF vector) that can be expressed as scalars or Boolean dimensions. In the Covariance family of text classification models, a normalized covariance (also referred to herein as the "correlation") of each such attribute (e.g., a present Boolean attribute, an absent Boolean attribute) with positive examples of input text samples for a particular class or category is calculated, computed, determined, or otherwise obtained, and attributes for which the correlation is above a predetermined positive threshold (e.g., +0.1) or below a predetermined negative threshold (e.g., −0.1) are stored or otherwise maintained in the text classification model, while other attributes that do not satisfy such criteria are discarded. As the text classification models provide suggestions (or predictions) in real-time regarding what predefined label(s) to assign to input text sample(s), the correlation corresponding to each present Boolean attribute is multiplied by 1.0 (or any other suitable value), and the correlation corresponding to each absent Boolean attribute is multiplied by 0.0 (or any other suitable value), ignoring all other attributes that were not either stored or maintained in the text classification model. The sum of the products of the correlations and Boolean attributes can then be averaged to produce an averaged result, and, if the averaged result is positive, then the text classification model can suggest (or predict) that the Boolean attribute corresponds to a positive example for the particular class or category. Otherwise, if the averaged result is negative, then the text classification model can suggest (or predict) that the Boolean attribute corresponds to a negative example for the particular class or category. In such alternative embodiments, the phi coefficient of correlation (or any other suitable correlation coefficient) can be used as a confidence score in the determination of whether an attribute is a positive (or negative) example for a particular class or category. Such a correlation coefficient (CORRELATION) can also be displayed as a model statistic in the region 208 of the GUI 200 (see FIG. 2).

It was still further described herein that as the machine learning classifiers 108 for the various classes or categories of input text samples train with the training data, the text classification models 112 can provide label suggestions (or predictions) in real-time regarding what predefined label(s) to assign to any input text sample(s) currently in the training data or any new input text sample(s) further provided as training data for the machine learning classifiers 108. In certain alternative embodiments, the text classification models 112 can further provide label suggestions (or predictions) for input text samples that would likely result in high information gain for training the machine learning classifiers 108. For example, one or more of the text classification models 112 can provide prioritized label suggestions (or predictions) for input text samples containing frequently occurring words, phrases, tokenized words/phrases, and/or dimensions that have little or no coverage in existing training data or have low confidence scores, or any other suitable label suggestions (or predictions) likely to result in high information gain.

It was also described herein with reference to an illustrative example that the disclosed system 100 (see FIG. 1a) for real-time generation and customization of text classification models can be configured as an online meeting system, a desktop sharing system, and/or a video conferencing system. In certain alternative embodiments, the system 100 can be configured to handle social media, chat logs, resume filtering, transcripts (e.g., user interviews, sales calls, customer support), and/or any other suitable application that requires labeling of a text corpus.

Although features are shown and described herein with reference to particular illustrative embodiments hereof, such features may be included and hereby are included in any of the disclosed embodiments and their variants. Thus, it is understood that features disclosed in connection with any embodiment are included as variants of any other embodiment. Further, the improvement or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, acts, elements, or aspects of something in an open-ended fashion. Also, as used herein and unless a specific statement is made to the contrary, the word "set" or "subset" means one or more of something. This is the case regardless of whether the phrase "set of" or "subset of" is followed by a singular or plural object, and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. Although certain embodiments are disclosed herein, it is understood that these are provided by way of example only, and that the disclosed systems and methods are not limited to these particular embodiments.

While various embodiments of the present application have been particularly shown and described, it will be understood by those skilled in the art that various changes in form and details may be made therein without departing from the scope of the present application as defined by the appended claims.

What is claimed is:

1. A computer-implemented method of training a plurality of text classification models, comprising:
predefining multiple labels corresponding to various classes of input text samples for an initial dataset of the input text samples;
manually assigning the predefined labels to selected ones of the initial dataset of the input text samples to indicate that the input text samples belong in particular ones of the various classes;
once a predefined label has been manually assigned to each of the initial dataset of the input text samples, providing the initial dataset of the input text samples as training data to train a plurality of machine learning classifiers for generating the plurality of text classification models, respectively, the plurality of text classification models corresponding to the various classes, respectively;
generating the plurality of text classification models taking into account individual keywords or pairs of keywords that occur in a predetermined threshold number of positive examples of the input text samples for a particular class, but do not occur in more than a specified number of negative examples of the input text samples for the particular class;
while the plurality of machine learning classifiers train with the training data, providing label suggestions in real-time by the plurality of text classification models regarding what predefined labels to assign to any of the input text samples in the training data;
manually assigning the predefined labels to at least some of the input text samples in accordance with the label suggestions from the plurality of text classification models; and
providing the at least some of the input text samples as supplements to the training data for the plurality of machine learning classifiers.

2. The computer-implemented method of claim 1 further comprising:
once a predefined label has been manually assigned to each of the initial dataset of the input text samples, tokenizing the initial dataset of the input text samples, and
wherein the providing of the initial dataset of the input text samples includes providing the tokenized initial dataset of the input text samples as training data to train the plurality of machine learning classifiers.

3. The computer-implemented method of claim 1 further comprising:
determining whether or not the plurality of machine learning classifiers require additional training based at least on statistics pertaining to the respective text classification models.

4. The computer-implemented method of claim 1 further comprising:
having determined that the plurality of machine learning classifiers do not require additional training, providing further label suggestions in real-time by the plurality of text classification models for subsequent input text samples for the various classes of the input text samples.

5. The computer-implemented method of claim 1 wherein the generating of the plurality of text classification models includes weighting each of the individual keywords by a weighting parameter, |N/W|, "N" corresponding to a number of occurrences of the individual keyword in a respective input text sample, and "W" corresponding to a total number of words in the respective input text sample.

6. The computer-implemented method of claim 1 wherein the generating of the plurality of text classification models includes taking into account the individual keywords that occur in purportedly positive examples of the input text samples for the particular class, but indicate that the purportedly positive examples are more appropriately regarded as negative examples of the input text samples for the particular class.

7. The computer-implemented method of claim 1 wherein the generating of the plurality of text classification models includes taking into account an order of the pairs of keywords in the input text samples while making determinations as to whether the input text samples are positive examples or negative examples for particular classes of the input text samples.

8. The computer-implemented method of claim 1 further comprising:
once a predefined label has been manually assigned to each of the initial dataset of the input text samples, vectorizing the initial dataset of the input text samples, and
wherein the providing of the initial dataset of the input text samples includes providing the vectorized initial dataset of the input text samples as training data to train the plurality of machine learning classifiers.

9. A computer-implemented method of training a plurality of text classification models, comprising:
predefining multiple labels corresponding to various classes of input text samples for an initial dataset of the input text samples;
manually assigning the predefined labels to selected ones of the initial dataset of the input text samples to indicate that the input text samples belong in particular ones of the various classes;
once a predefined label has been manually assigned to each of the initial dataset of the input text samples, providing the initial dataset of the input text samples as training data to train a plurality of machine learning classifiers for generating the plurality of text classification models, respectively, the plurality of text classification models corresponding to the various classes, respectively;
generating the plurality of text classification models taking into account a covariance of attributes that can be expressed as scalars or Boolean dimensions, the attributes including one or more of individual keywords, weighted keywords, and dimensions of a vectorized keyword in the initial dataset of the input text samples;
while the plurality of machine learning classifiers train with the training data, providing label suggestions in real-time by the plurality of text classification models regarding what predefined labels to assign to any of the input text samples in the training data;
manually assigning the predefined labels to at least some of the input text samples in accordance with the label suggestions from the plurality of text classification models; and
providing the at least some of the input text samples as supplements to the training data for the plurality of machine learning classifiers.

10. A system for training a plurality of text classification models, comprising:
a server including at least one processor operative to execute at least one program out of at least one memory:
to receive an initial dataset of input text samples with predefined labels manually assigned thereto to indicate that the input text samples belong in particular ones of various classes;
to provide the initial dataset of the input text samples as training data to train a plurality of machine learning classifiers for generating the plurality of text classification models, respectively, the plurality of text classification models corresponding to the various classes, respectively;
to generate the plurality of text classification models taking into account individual keywords or pairs of keywords that occur in a predetermined threshold number of positive examples of the input text samples for a particular class, but do not occur in more than a specified number of negative examples of the input text samples for the particular class;
while the plurality of machine learning classifiers train with the training data, to provide, through the plurality of text classification models, label suggestions in real-time regarding what predefined labels to assign to any of the input text samples in the training data;
to receive at least some of the input text samples with the predefined labels manually assigned thereto in accordance with the label suggestions; and
to provide the at least some of the input text samples as supplements to the training data for the plurality of machine learning classifiers.

11. The system of claim 10 wherein the at least one processor is further operative to execute the at least one program out of the at least one memory:
to tokenize the initial dataset of the input text samples; and
to provide the tokenized initial dataset of the input text samples as training data to train the plurality of machine learning classifiers.

12. The system of claim 10 wherein the at least one processor is further operative to execute the at least one program out of the at least one memory:
to determine whether or not the plurality of machine learning classifiers require additional training based at least on statistics pertaining to the respective text classification models.

13. The system of claim 10 wherein the at least one processor is further operative to execute the at least one program out of the at least one memory:
having determined that the plurality of machine learning classifiers do not require additional training, to provide, through the plurality of text classification models, further label suggestions in real-time for subsequent input text samples for the various classes of the input text samples.

14. The system of claim 10 wherein the server including the at least one processor and the at least one memory is configured to implement one or more of an online meeting system, a desktop sharing system, and a video conferencing system.

15. A method comprising:
receiving an initial dataset of input text samples with predefined labels manually assigned thereto to indicate that the input text samples belong in particular ones of various classes;
providing the initial dataset of the input text samples as training data to train a plurality of machine learning classifiers for generating a plurality of text classification models, respectively, the plurality of text classification models corresponding to the various classes, respectively;
while the plurality of machine learning classifiers train with the training data, providing, through the plurality of text classification models, label suggestions in real-time regarding what predefined labels to assign to any of the input text samples in the training data;
receiving at least some of the input text samples with the predefined labels manually assigned thereto in accordance with the label suggestions; and
providing the at least some of the input text samples as supplements to the training data for the plurality of machine learning classifiers.

16. The method of claim 15 further comprising:
tokenizing the initial dataset of the input text samples; and
providing the tokenized initial dataset of the input text samples as training data to train the plurality of machine learning classifiers.

17. The method of claim 15 further comprising:
determining whether or not the plurality of machine learning classifiers require additional training based at least on statistics pertaining to the respective text classification models.

18. The method of claim 15 further comprising:
having determined that the plurality of machine learning classifiers do not require additional training, providing, through the plurality of text classification models, further label suggestions in real-time for subsequent input text samples for the various classes of the input text samples.

19. The method of claim 15 further comprising:
while the plurality of machine learning classifiers train with the training data, providing, through the plurality of text classification models, label suggestions in real-time for at least some of the input text samples that would result in high information gain for training the plurality of machine learning classifiers.

20. The method of claim 15 further comprising:
generating the plurality of text classification models taking into account individual keywords or pairs of keywords that occur in a predetermined threshold number of positive examples of the input text samples for a particular class, but do not occur in more than a specified number of negative examples of the input text samples for the particular class.

* * * * *